United States Patent [19]
Higuchi et al.

[11] Patent Number: 5,856,253
[45] Date of Patent: Jan. 5, 1999

[54] METHOD OF REINFORCING MOLDED BODY OF CERAMIC AND REINFORCED MOLD BODY OF CERAMIC

[75] Inventors: Yoshikatsu Higuchi; Masanori Okabe; Yasunobu Kawakami, all of Saitama-ken, Japan

[73] Assignee: Honda Giken Kogyo Kabushiki Kaisha, Tokyo, Japan

[21] Appl. No.: 877,953

[22] Filed: Jun. 17, 1997

Related U.S. Application Data

[63] Continuation-in-part of Ser. No. 727,766, Oct. 8, 1996, abandoned, which is a continuation of Ser. No. 378,363, Jan. 25, 1995, abandoned.

[30] Foreign Application Priority Data

Jan. 28, 1994 [JP] Japan ................................. 6-026142

[51] Int. Cl.[6] ................................................. C04B 35/58
[52] U.S. Cl. ..................... 501/96.1; 501/96.2; 501/96.5; 264/86
[58] Field of Search ................... 501/95.1, 95.2, 501/96.1, 96.2, 97.1, 96.5; 264/86

[56] References Cited

U.S. PATENT DOCUMENTS

| | | | |
|---|---|---|---|
| 5,021,370 | 6/1991 | Ishikawa et al. | 501/92 |
| 5,032,551 | 7/1991 | Tashiro et al. | 525/474 |
| 5,055,431 | 10/1991 | Blum et al. | 501/96 |
| 5,151,390 | 9/1992 | Aoki et al. | 501/92 |
| 5,210,058 | 5/1993 | Takeda et al. | 501/97 |
| 5,459,114 | 10/1995 | Kaya et al. | 501/97 |

FOREIGN PATENT DOCUMENTS 4238874  8/1992  Japan.

OTHER PUBLICATIONS

Japanese Patent Abstract–"Sintered Compact of Silicon Nitride and its Production" Higuchi et al., JP06–128052 (May. 10, 1994) See abstract Japanese Patent Abstract–"Silicon Nitride Based Sintered Compact and its Production" Higuchi et al., JP06–128040 (May 10, 1994) See abstract

*Primary Examiner*—Paul Marcantoni
*Attorney, Agent, or Firm*—Birch, Stewart, Kolasch, & Birch, LLP

[57] ABSTRACT

A reinforced molded body of ceramic, which is to be fired, is produced by adding ceramic fibers to a matrix of ceramic. The ceramic fibers are composed of silicon, nitrogen, oxygen, and carbon, the carbon and the oxygen having a total content of at most 10 weight % and having respective contents at a ratio ranging from 0.08 to 2.

10 Claims, 2 Drawing Sheets

METHOD OF REINFORCING MOLDED BODY OF CERAMIC AND REINFORCED MOLD BODY OF CERAMIC

This application is a continuation-in-part of U.S. application Ser. No. 08/727,766 filed on Oct. 8, 1996, now abandoned, which was a continuation of U.S. application Ser. No. 08/378,363 filed on Jan. 25, 1995, now abandoned.

BACKGROUND OF THE INVENTION

1. Field of the Invention

The present invention relates to a method of reinforcing a molded body of ceramic by adding ceramic fibers and a reinforced molded body of ceramic which is produced by such a method, and more particularly to a method of reinforcing a molded body of ceramic by adding ceramic fibers which will not adversely affect the firing characteristics of the molded body of ceramic and a reinforced molded body which is produced by such a method.

2. Description of the Prior Art

Sintered bodies of ceramic are generally produced by molding a powder of ceramic into a molded body (green body) of desired shape and then firing the molded body. Since ceramic materials are difficult to machine once fired, they are molded into desired shapes before firing.

There have been known various processes for producing a molded body of ceramic. Among the presently available processes are a process of pressing a powder of ceramic with a die assembly, a process of injection-molding a ceramic material, a slip-casting process for casting a ceramic slurry or slip (or a kneaded mixture of resin or the like) into a plaster mold, and a cold isostatic pressing process of compacting a powder of ceramic with a rubber press. For producing molded bodies which are relatively thin or complex in shape, it is preferable to employ a slip-casting process, an injection-molding process, or a process using a doctor blade.

According to the slip-casting process, a ceramic material is ground into a powder, the powder is dispersed in water, producing a slurry or slip. The slurry is then poured into a plaster mold, and the water of the slurry is absorbed into and passed through the plaster mold, thereby forming a molded body (green body) of ceramic powder.

Ceramics of silicon nitride ($Si_3N_4$) are finding wide use as substitutes for metallic materials because they are highly resistant to heat, highly mechanically strong, highly hard, and relatively lightweight. Since ceramics of silicon nitride are generally difficult to sinter, it has been customary to add a sintering additive of yttrium oxide ($Y_2O_3$), aluminum oxide ($Al_2O_3$), or the like and powders of other additives to a powder of silicon nitride, produce a molded body from a slurry of such a mixture according to the slip-casting process, and then fire the molded body.

However, a molded body of ceramic which is produced according to the slip-casting process does not have a sufficiently large mechanical strength and hence tends to break because the bonding strength between the particles of the ceramic powder is not necessarily large even if a binder is added to the ceramic powder. The molded body of ceramic is liable to shrink and crack due to dehydration and drying thereof in the plaster mold. For these reasons, it has been difficult to manufacture thin or complex molded bodies of ceramic without the danger of breaking or cracking.

The inventors have proposed a process of generating fibers of silicon (Si), nitrogen (N), carbon (C), and oxygen (O) by thermally decomposing polysilazane, and adding the generated fibers to a ceramic material to increase the mechanical strength of a molded body of ceramic, as disclosed in Japanese laid-open patent publication No. 4-238874. It has been found, however, that while the molded body of ceramic is being fired, some of the fibers are lost on account of different fiber compositions, leaving pores in the fired body. If a large amount of such fibers is added to a ceramic material, then the fired body of ceramic will contain many pores, resulting in a reduction in the mechanical strength of the fired body.

SUMMARY OF THE INVENTION

It is therefore an object of the present invention to provide a method of reinforcing a molded body of ceramic to make the molded body sufficiently mechanically strong and resistant to cracking to prevent the molded body from breaking and cracking.

Another object of the present invention is to provide a reinforced molded body produced by such a method.

In research efforts to achieve the above object, the inventors have found that ceramic fibers added to a molded body of ceramic are lost upon being fired because oxygen in the ceramic fibers reacts with carbon and nitrogen and is separated as carbon monoxide and silicon monoxide, and that when ceramic fibers of a certain composition with reduced contents of oxygen and carbon are added to ceramic materials, the mechanical strength of a produced molded body is increased.

According to the present invention, there is provided a method of reinforcing a molded body of ceramic, comprising the step of adding ceramic fibers to a matrix of ceramic, said ceramic fibers being composed of silicon, nitrogen, oxygen, and carbon, said carbon and said oxygen having a total content of at most 10 weight % and having respective contents at a ratio ranging from 0.08 to 2.

According to the present invention, there is also provided a reinforced molded body of ceramic comprising a matrix of ceramic, and ceramic fibers added to said matrix of ceramic, said ceramic fibers being composed of silicon, nitrogen, oxygen, and carbon, said carbon and said oxygen having a total content of at most 10 weight % and having respective contents at a ratio ranging from 0.08 to 2.

The matrix contains oxygen, said oxygen in said fibers and said oxygen in said matrix having respective contents at a ratio of at most 6.

The matrix also contains silicon and nitrogen, said silicon in said fibers and said silicon in said matrix having respective contents at a ratio of at least 0.8, and said nitrogen in said fibers and said nitrogen in said matrix having respective contents at a ratio of at least 0.6.

The ratio of the contents of said carbon and said oxygen ranges preferably from 0.1 to 1.5, and more preferably from 0.2 to 1.0.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
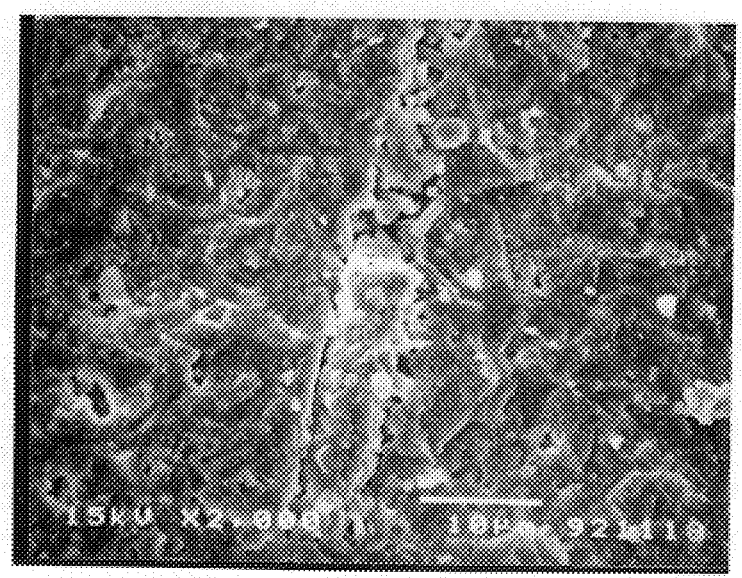
FIG. 1 is a diagram showing an electron microscope photographic representation (x 2000) of a fired body of ceramic produced according to Inventive Example 1.

The principles of the present invention are applicable to reinforcing any molded bodies of ceramic, but are particularly useful when embodied in a process of reinforcing a molded body of silicon nitride ceramic.

[1] Materials of a Molded Body of Ceramic

To manufacture ceramics composed primarily of silicon nitride, a powder of either α- or β-silicon nitride may be used. A ceramic of silicon nitride may be manufactured by a process of directly nitriding silicon, or a process of reducing and nitriding silica, or a process of thermally decomposing silicon diimide, or a process of reacting $SiH_4 + NH_3 + N_2$ in a vapor phase. The average particle diameter of the power of silicon nitride should preferably be in the range of from 3 to 0.01 μm, and more preferably be in the range of from 1.5 to 0.1 μm.

A ceramic additive that can be added to the silicon nitride may be an oxide, a nitride, or a carbide of any of elements belonging to Groups IIIA, IIIB, and IVB. Generally, an additive of alumina, yttria, hafnium oxide, magnesia, or the like can serve as a sintering additive in ceramics of silicon nitride.

It has been disclosed in Japanese laid-open patent publication No. 4-238874 to add a sintering additive component in a fibrous form for increasing the mechanical strength of a green body. However, the disclosed process has been problematic in that the added fibrous sintering additive is limited to certain materials and hence the produced fired bodies are limited to certain characteristics. According to the present invention, the mechanical strength of a green body is not increased by adding a sintering additive component in a fibrous form, but by adding ceramic fibers, as described below.

Ceramic fibers used in the present invention are amorphous or crystalline ceramic fibers containing impurities of oxygen and carbon, and composed of silicon and nitrogen as indispensable components. The carbon and oxygen in the ceramic fibers have a total content of 10 weight % or less, and have respective contents at a ratio ranging from 0.08 to 2, preferably from 0.1 to 1.5, and more preferably from 0.2 to 1.0. Such a composition of the ceramic fibers allows sintered ceramics to have their mechanical strength and high-temperature strength kept at a high level. If the ceramic fibers did not have such a composition, then the mechanical strength and high-temperature strength of sintered ceramics would be lowered. The ceramic fibers used in the present invention may preferably be made of polysilazane which is thermally decomposed after being melted and spun.

[2] Production of polysilazane

A process of producing the above ceramic fibers will be described below. The polysilazane from which the ceramic fibers are made may be synthesized from cyclosilazane represented by a formula of $(R_2SiNR)_3$ or the like where R represents H or an alkyl group, and chlorosilane represented by a formula of $(R_nSiCl)_{4-n}$ where n=0, 1, 2, 3, and R represents H or an alkyl group. A process of synthesizing polysilazane from cyclosilazane and chlorosilane will be described below. However, the present invention is not limited to such a process, but polysilazane can be synthesized by any of various other processes.

Hexamethylcyclotrisilazane $(Me_2SiNH)_3$ is used as cyclosilazane, and trichloromethylsilane used as chlorosilane is mixed with hexamethylcyclotrisilazane. Hexamethylcyclotrisilazane and trichloromethylsilane are mixed with each other at a molar ratio of 1:1~1:5, or more preferably at a molar ratio of a 1:3.

Then, the mixture of hexamethylcyclotrisilazane and trichloromethylsilane is perfused with heat at a temperature ranging from about 190° to 195° C., whereupon the hexamethylcyclotrisilazane is split open generating a chlorosilazane oligomer. The step of producing a chlorosilazane oligomer from hexamethylcyclotrisilazane and trichloromethylsilane is completed in about 12 hours.

Thereafter, an ammonia gas is blown into a solution of chlorosilazane oligomer at a rate of 10~90 liters/hour, preferably 30~60 liters/hour to effect ammonolysis for converting the chlorosilazane oligomer into an aminosilazane oligomer. Ammonium chloride formed as a by-product in the ammonolysis is separated and removed.

The produced aminosilazane oligomer is deammoniated in an inert gas such as a nitrogen gas or the like or while being heated to a temperature ranging from about 250° to 400° C., producing thermoplastic polysilazane in a solid phase. The softening point of the produced polysilazane can be adjusted depending on the heating condition, but should preferably be in the range of from 50° to 200° C.

[3] Production of Ceramic Fibers

The produced polysilazane is melted by being kept at a temperature higher than its softening point, and then spun at a takeup speed ranging from 25 to 400 m/minute, thereby producing a fiber having a diameter ranging from 5 to 30 μm.

To the produced fiber, there is applied a flow of chlorosilane, e.g., trichloromethylsilane, bubbled with nitrogen gas. The rate of flow of applied chlorosilane should preferably be in the range of from 10 to 500 ml/minute in terms of the rate of flow of the nitrogen gas which is used to bubble the chlorosilane. Depending on the amount of fiber to be processed, the flow of chlorosilane is applied to the fiber for a period of time ranging from 1 to 48 hours. The flow of chlorosilane is applied to the fiber at a temperature lower than the softening point of the fiber. The application of chlorosilane causes chlorosilane and polysilazane to be cross-linked on the surface of the fiber.

Then, the fiber is made infusible by applying ammonia gas at a temperature ranging from 50° C. to the softening point of the fiber. The period of time for which the fiber is made infusible is adjusted depending on the amount of fiber to be processed. Since the fiber is processed in the presence of ammonia, the chlorine and hydrocarbon groups on the fiber surface are replaced with ammonia, accelerating the cross-linking reaction on the fiber surface, so that the fiber can be made infusible.

Finally, the fiber is fired at a temperature ranging from 800° to 1400° C. for a period of time ranging from 0.5 to 4 hours in a mixed gas of ammonia or hydrogen and nitrogen. When the fiber is thus fired, the contents of carbon and oxygen in the fiber are reduced. As a result, a ceramic fiber composed of silicon, nitrogen, and carbon and containing an oxygen impurity is produced. The ceramic fiber which is finally produced has a diameter in the range of from 1 to 20 μm.

Preferably, ceramic fibers for use in a molded body of ceramic have an average diameter of 20 μm or less, particularly in the range of from 3 to 10 μm, and a length ranging from 10 to 1000 μm, particularly from 100 to 800 μm. If the average diameter and length were too large, then the dispersing qualities of the ceramic fibers would be lowered, tending to render sintered bodies defective and reduce the density thereof. If the average diameter and length were too small, then the added ceramic fibers would not have a sufficient reinforcing capability.

[4] Production of a Molded Body of Ceramic

A molded body of ceramic is produced by adding the ceramic fibers to a matrix composed of a sintering additive component and silicon nitride. In a method of reinforcing a molded body of ceramic according to the present invention, it is preferable that the ratio of the content of oxygen in the ceramic fibers to the content of oxygen in the matrix be 6 or lower, the ratio of the content of silicon in the ceramic fibers to the content of silicon in the matrix be 0.8 or higher, and the ratio of the content of nitrogen in the ceramic fibers to the content of nitrogen in the matrix be 0.6 or higher. These content ratios are effective to reduce the content of oxygen which is involved in the decomposition in the molded body of ceramic and lower the amounts of oxides of carbon and silicon that will be eliminated when the molded body of ceramic is fired.

The powder of silicon nitride should be 72 weight % or higher, and the ceramic fibers produced from polysilazane should range from 1 to 20 weight %, preferably 0.62 to 12.4 weight %, and more preferably 0.62 to 9.3 weight %. A sintering additive of $Al_2O_3$, $Y_2O_3$, $HfO_2$, or the like should be in the range of from 3 to 8 weight %. If the amount of added ceramic fibers were smaller than the lower limit of the above range, then their reinforcing capability would not be sufficient, tending to allow the molded body of ceramic to break or crack.

The molded body of ceramic may also contain an organic fiber composed of a small amount of wax or resin, or an organic material, metallic fibers, or the like.

A process of manufacturing a molded body of ceramic will be described below.

A powder of silicon nitride as a major component, a sintering additive $Al_2O_3$, $Y_2O_3$, $HfO_2$, or the like, and ceramic fibers produced from polysilazane are uniformly dispersed in a dispersion medium of water or a organic solvent, thereby making a slurry or slip. All the materials may be simultaneously added together. However, it is preferable to add the powder of silicon nitride which is of good dispersing qualities and a powder of sintering additive to each other, and thereafter add ceramic fibers produced from polysilazane.

If water is used as the dispersion medium, then it is preferable to add aqueous ammonia ($NH_4OH$). Since aqueous ammonia has good dispersing qualities, it is possible to prepare a ceramic slurry of high concentration and low viscosity, so that a molded body of high density can be produced after being dried. Furthermore, the fired body is of high purity, free from impurities of sodium, calcium, or the like, and a graph phase in grain boundaries can be reduced, permitting the fired body to maintain a high level of high-temperature strength. If there is an increased graph phase in grain boundaries, then the mechanical strength of the fired body at high temperatures is lowered. Use of an organic solvent of high polarity, such as formamide, as the dispersion medium is preferable for the purpose of maintaining a high level of high-temperature strength. The concentration of the slurry should preferably range from 40 to 60 volume % for desired moldability though no particular limitations are imposed on the slurry concentration.

While a molded body of ceramic may be produced by the injection-molding process, the slip-casting process, or the process using a doctor blade, best results can be achieved when the slip-casting process is employed.

Finally, the molded body of silicon nitride ceramic is fired. In the firing step, the ceramic fibers in the molded body change to α- and β-silicon nitride, thereby forming a uniform ceramic. Therefore, the fired body is of good mechanical properties and heat resistance.

According to the method of the present invention, a molded body of compacted ceramic powder which is highly subject to fracture is reinforced by ceramic fibers added as a reinforcing material for increased mechanical strength, elongation, and strain resistance. The added ceramic fibers that are of the above composition are prevented from being greatly eliminated when the molded body is fired.

Inventive and Comparative Examples will be described below.

Inventive Example 1

[1] Synthesis of polysilazane 54.8 g of hexamethylcyclotrisilazane and 111 g of trichloromethylsilane (the molar ratio of hexamethylcyclotrisilazane and trichloromethylsilane was 1:3) were placed in a 500-ml three-neck flask having a cooling tower and a condenser and sufficiently replaced with nitrogen gas, heated by a heating mantle to a temperature ranging from 190° to 195° C., and perfused with the heat for 12 hours. After being cooled to room temperature, ammonium chloride produced as a by-product was filtered out, and 136 g of chlorosilazane oligomer was obtained.

100 g of the produced chlorosilazane oligomer was placed in a 2-liter three-neck flask having a mechanical stirrer, a cooling pipe, and a blowing pipe, and sufficiently replaced with nitrogen, and about 1 liter of cyclohexane was added as a solvent. The mixture was cooled with ice and stirred during which time an ammonia gas was blown into the mixture at a rate of about 60 liters/hour for 3 hours to carry out ammonolysis. Thereafter, ammonium chloride produced as a by-product was filtered out under suction, and the solvent was removed, producing 76 g of a colorless viscous liquid, i.e., an aminosilazane oligomer.

50 g of the produced aminosilazane oligomer was placed in a reaction chamber, and thermally treated in a flow of nitrogen at a temperature of 350° C. for 30 minutes, thereby producing 32 g of thermoplastic solid polysilazane. The number average molecular weight of the produced polysilazane was 1500 as determined by gel permeation chromatography (GPC). The softening point as measured by a penetration process with a load of 1 g was 86° C.

[2] Production of Ceramic Fibers

The polysilazane was placed in a spinning nozzle of copper, and kept at 180° C. for 30 minutes for deaeration. Subsequently, the polysilazane was maintained at a lowered temperature of 130° C. for 10 minutes. The melted polysilazane was pushed out of the spinning nozzle by a nitrogen gas under a pressure of 0.2 $kg/cm^2$, as a gelled fiber which was wound on a bobbin having a diameter of 120 mm at a rate of 70 m/minute. The produced gelled fiber had an average diameter between 10 to 20 μm.

The fiber was then chopped into fibers each having a length of about 100 mm, and 50 g of the chopped fibers were placed in a tubular furnace of alumina having a gas inlet pipe. After the tubular furnace was replaced with nitrogen gas, it was supplied with a flow of trichloromethylsilane bubbled with nitrogen gas at a rate of 300 ml/minute for 10 hours.

The temperature in the tubular furnace was increased to 80° C. at a rate of 5° C./minute, and ammonia gas was flowed in the tubular furnace at a rate of 500 ml/minute for 4 hours, thereby making the fibers infusible. Then, the ammonia gas was flowed in the tubular furnace at a rate of 100 ml/minute, and the temperature in the tubular furnace was increased to 1200° C. at a rate of 10° C./minute and kept at 1200° C. for 30 minutes for thereby thermally decomposing the fibers into 23 g of inorganic ceramic fibers.

The produced ceramic fibers were white fibers each having a diameter ranging from 8 to 15 $\mu$m, and the tensile strength thereof reached a level of 30 kg/mm$^2$ or higher required to reinforce a molded body of ceramic. An elemental analysis of the produced ceramic fibers was conducted. Percentages of the elements Si, N, C, and O contained in the produced ceramic fibers are given in Table 1 below.

[3] Production of a Molded Body of Ceramic

The ceramic fibers were crushed into smaller fibers by a mixer, and those fibers which passed through a filter of # 600 $\mu$m and did pass through a filter of # 350 $\mu$m were used. The used fibers had a length ranging from 400 to 600 $\mu$m.

95.38 weight % of a powder of silicon nitride having an average diameter of 0.5 $\mu$m, 1.5 weight % of a powder of yttria having an average diameter of 0.8 $\mu$m, and 2.5 weight % of a powder of hafnium oxide having an average diameter of 1 $\mu$m were mixed into a slurry. To the slurry, there was added 0.62 weight % of the above fibers. After they were uniformly mixed, a molded body having a width of 30 mm, a height of 6 mm, and a length of 50 mm was formed from the mixture according to the slip-casting process.

The molded body was not broken or cracked while being handled, and any shrinkage of the molded body after being dried was small.

[4] Production of a Fired Body of Ceramic

The molded body was then fired at 1900° C. in nitrogen gas under a pressure of 9 atm for 4 hours. From the fired body of silicon nitride which was produced, there was cut out a prism having a width of 4 mm, a height of 3 mm, and a height of 40 mm. The prism was measured for bending strength at room temperature and 1400° C. according to JIS (Japan Industrial Standards) R1601 (1981). The results of the measurement are given in Table 2 below. FIG. 1 shows an electron microscope photographic representation of fibers in the fired ceramic matrix.

Comparative Example 1

Figure 2:
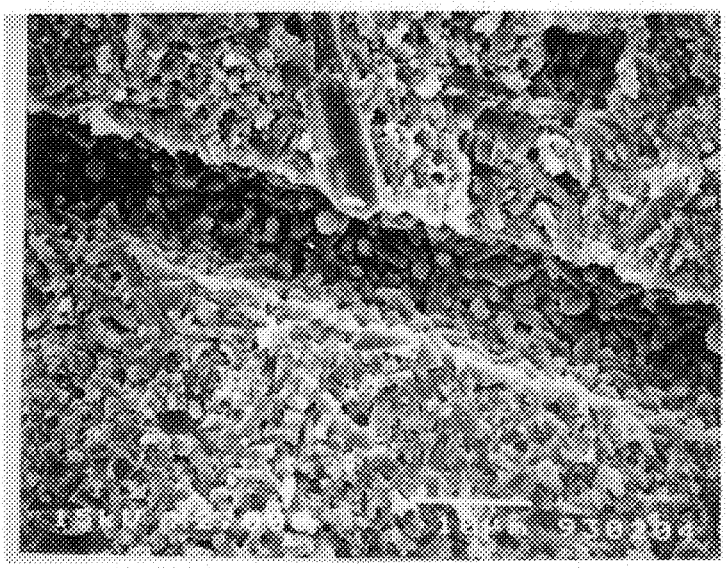
FIG. 2 is a diagram showing an electron microscope photographic representation (x 2000) of a fired body of ceramic produced according to Comparative Example 1.

The same processes as those described above with reference to Inventive Example 1, except for the conditions for making the fibers infusible and the atmospheric gas used in thermally decomposing the fibers, were carried out. The fibers were made infusible at a furnace temperature of 40° C. in an atmosphere having a humidity of 90% for 64 hours, and thermally decomposed in a nitrogen gas atmosphere under a pressure of 1 atm. An elemental analysis of the produced ceramic fibers was conducted. Percentages of the elements Si, N, C, and O contained in the produced ceramic fibers are given in Table 1. The produced fired body of silicon nitride was measured for bending strength at room temperature and 1400° C. in the same manner as Inventive Example 1. The results of the measurement are given in Table 2. FIG. 2 shows an electron microscope photographic representation of fibers in the fired ceramic matrix.

Comparative Example 2

The same processes as those described above with reference to Inventive Example 1, except for the conditions for making the fibers infusible and the atmospheric gas used in thermally decomposing the fibers, were carried out. The fibers were made infusible at a furnace temperature of 40° C. in an atmosphere having a humidity of 90% for 48 hours, and thermally decomposed in a nitrogen gas atmosphere under a pressure of 1 atm. An elemental analysis of the produced ceramic fibers was conducted. Percentages of the elements Si, N, C, and O contained in the produced ceramic fibers are given in Table 1. The produced fired body of silicon nitride was measured for bending strength at room temperature and 1400° C. in the same manner as Inventive Example 1. The results of the measurement are given in Table 2.

Comparative Example 3

The same processes as those described above with reference to Inventive Example 1, except for the conditions for making the fibers infusible and the atmospheric gas used in thermally decomposing the fibers, were carried out. The fibers were made infusible at a furnace temperature of 40° C. in an atmosphere having a humidity of 90% for 64 hours, and thermally decomposed in a hydrogen gas atmosphere under a pressure of 1 atm. An elemental analysis of the produced ceramic fibers was conducted. Percentages of the elements Si, N, C, and O contained in the produced ceramic fibers are given in Table 1. The produced fired body of silicon nitride was measured for bending strength at room temperature and 1400° C. in the same manner as Inventive Example 1. The results of the measurement are given in Table 2.

Comparative Example 4

The same processes as those described above with reference to Inventive Example 1, except for the conditions for making the fibers infusible and the atmospheric gas used in thermally decomposing the fibers, were carried out. The fibers were made infusible at a furnace temperature of 40° C. in an atmosphere having a humidity of 90% for 64 hours, and thermally decomposed in a hydrogen gas atmosphere under a pressure of 10 atm. An elemental analysis of the produced ceramic fibers was conducted. Percentages of the elements Si, N, C, and O contained in the produced ceramic fibers are given in Table 1. The produced fired body of silicon nitride was measured for bending strength at room temperature and 1400° C. in the same manner as Inventive Example 1. The results of the measurement are given in Table 2.

Comparative Example 5

Figure 3:
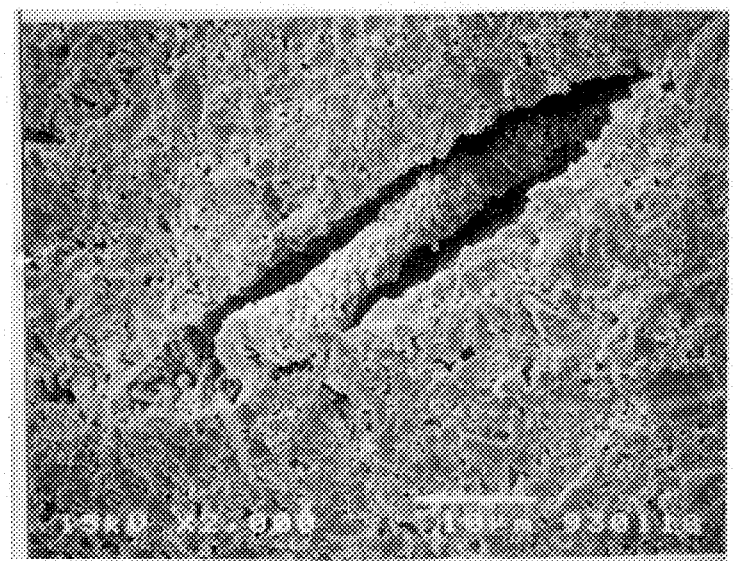
FIG. 3 is a diagram showing an electron microscope photographic representation (x 2000) of a fired body of ceramic produced according to Comparative Example 5.

The same processes as those described above with reference to Inventive Example 1, except for the conditions for making the fibers infusible, were carried out. The fibers were made infusible at a furnace temperature of 40° C. in an atmosphere having a humidity of 90% for 64 hours. An elemental analysis of the produced ceramic fibers was conducted. Percentages of the elements Si, N, C, and O contained in the produced ceramic fibers are given in Table 1. The produced fired body of silicon nitride was measured for bending strength at room temperature and 1400° C. in the same manner as Inventive Example 1. The results of the measurement are given in Table 2. FIG. 3 shows an electron microscope photographic representation of fibers in the fired ceramic matrix.

Comparative Example 6

The same processes as those described above with reference to Inventive Example 1, except for the atmospheric gas used in thermally decomposing the fibers, were carried out. The fibers were thermally decomposed in a hydrogen gas atmosphere under a pressure of 10 atm. An elemental analysis of the produced ceramic fibers was conducted. Percentages of the elements Si, N, C, and O contained in the produced ceramic fibers are given in Table 1. The produced fired body of silicon nitride was measured for bending strength at room temperature and 1400° C. in the same manner as Inventive Example 1. The results of the measurement are given in Table 2.

TABLE 1

Elemental analysis of the produced ceramic fibers

| No. | Percentages of contained elements (weight %) | | | |
| --- | --- | --- | --- | --- |
|  | Si | O | N | C |
| In. Ex. 1 | 58.6 | 2.8 | 39.2 | 0.8 |
| Co. Ex. 1 | 50.6 | 17 | 17 | 16 |
| Co. Ex. 2 | 51.2 | 11 | 20 | 16 |
| Co. Ex. 3 | 56 | 16 | 22 | 7.6 |
| Co. Ex. 4 | 54.7 | 22 | 16 | 4.6 |
| Co. Ex. 5 | 44.7 | 29 | 22 | 0.3 |
| Co. Ex. 6 | 57.3 | 29.8 | 2.6 | 9.8 |

TABLE 2

Bending strength of the fired body of ceramic

| No. | Bending strength (MPa) | |
| --- | --- | --- |
|  | Room temperature | 1400° C. |
| In. Ex. 1 | 508 | 553 |
| Co. Ex. 1 | 420 | 425 |
| Co. Ex. 2 | 432 | 430 |
| Co. Ex. 3 | 438 | 440 |
| Co. Ex. 4 | 427 | 432 |
| Co. Ex. 5 | 220 | 380 |
| Co. Ex. 6 | 481 | 479 |

As can be understood from Table 1, the total content of the elements C, O in the ceramic fibers obtained according to Inventive Example 1 was less than 10 weight %, and the ratio of the contents of the elements C, O was 0.29. On the other hand, the total content of the elements C, O in the ceramic fibers obtained according to each of Comparative Examples 1 through 6 was greater than 10 weight %. As a result, as can be seen from Table 2, the bending strength of the fired body according to Inventive Example 1 was better than the bending strength of the sintered bodies according to Comparative Examples 1 through 6.

As shown in FIG. 1, the fired body according to Inventive Example 1 is of a uniform structure free of pores between the matrix and the fibers, and has its mechanical strength not reduced. However, the fired body according to Comparative Example 1 has a defect because a fiber is eliminated as shown in FIG. 2, and hence has a lowered mechanical strength. The mechanical strength of the fired body according to Comparative Example 5 is also lowered due to a crevice or gap which exists between a fiber remainder and the matrix, as shown in FIG. 3.

According to the method of reinforcing a molded body of ceramic, as described above, a molded body of ceramic is reinforced by ceramic fibers added thereto which have reduced contents of oxygen and carbon. The molded body of ceramic thus reinforced has a high mechanical strength which is prevented from being lowered when it is fired.

Since the fired body produced from the reinforced molded body of ceramic has a high mechanical strength and heat resistance, it can be used as a material of an automobile component such as a turbocharger rotor blade, for example.

Although certain preferred embodiments of the present invention has been shown and described in detail, it should be understood that various changes and modifications may be made therein without departing from the scope of the appended claims.

What is claimed is:

1. A method of manufacturing a sintered ceramic molded body from a molded ceramic body prepared by slip casting, said method comprising the steps of:

adding 0.62 to 9.3 weight % of ceramic fibers produced from polysilazane to a ceramic matrix of silicon nitride, wherein said ceramic fibers consist essentially of silicon, nitrogen, oxygen, and carbon, and have a length ranging from 10 to 1000 $\mu$m, wherein said carbon and said oxygen have a total content of at most 10 weight % based on the ceramic fibers and wherein the ratio of the weight of the carbon to the weight of the oxygen ranges from 0.08 to 2, in order to increase the strength of the molded ceramic body and maintain the strength of said sintered ceramic molded body produced therefrom;

molding the ceramic matrix with the added ceramic fibers, as a slurry having a concentration ranging from 40 to 60 volume %, into said molded ceramic body according to slip casting; and firing the molded ceramic body to produce said sintered ceramic molded body.

2. The method according to claim 1, wherein said ceramic matrix comprises oxygen, wherein the ratio of the weight % of said oxygen in said ceramic fibers to the weight % of said oxygen in said matrix is at most 6.

3. The method according to claim 1, wherein said ceramic matrix comprises silicon and nitrogen, wherein the ratio of the weight % of said silicon in said ceramic fibers to the weight % of said silicon in said ceramic matrix is at least 0.8, and wherein the ratio of the weight % of said nitrogen in said ceramic fibers to the weight % of said nitrogen in said ceramic matrix is at least 0.6.

4. The method according to claim 1, wherein said ratio of the weight of the carbon to the weight of the oxygen ranges from 0.1 to 1.5.

5. The method according to claim 4, wherein said ratio of the weight of the carbon to the weight of the oxygen ranges from 0.2 to 1.0.

6. A sintered ceramic molded body that is suitable for being manufactured from a molded ceramic body prepared by slip casting, said sintered ceramic molded body comprising:

a ceramic matrix of silicon nitride; and 0.62 to 9.3 weight % of ceramic fibers produced from polysilazane and added to said ceramic matrix, wherein said ceramic fibers consist essentially of silicon, nitrogen, oxygen, and carbon, and have a length ranging from 10 to 1000 $\mu$m, wherein said carbon and said oxygen have a total content of at most 10 weight % based on the ceramic fibers and wherein the ratio of the weight of the carbon to the weight of the oxygen ranges from 0.08 to 2, so that the strength of the molded ceramic body can be increased and the strength of said sintered ceramic molded body produced therefrom can be maintained, and said ceramic matrix and said ceramic fibers being molded from a slurry having a concentration ranging from 40 to 60 volume %.

7. The sintered ceramic molded body according to claim 6, wherein said ceramic matrix comprises oxygen, wherein the ratio of the weight % of said oxygen in said ceramic fibers to the weight % of said oxygen in said matrix is at most 6.

8. The sintered ceramic molded body according to claim 6, wherein said ceramic matrix comprises silicon and nitrogen, wherein the ratio of the weight % of said silicon in said ceramic fibers to the weight % of said silicon in said matrix is at least 0.8, and wherein the ratio of the weight % of said nitrogen in said ceramic fibers to the weight % of said nitrogen in said matrix is at least 0.6.

9. The sintered ceramic molded body according to claim 6, wherein said ratio of the weight of the carbon to the weight of the oxygen ranges from 0.1 to 1.5.

10. The sintered ceramic molded body according to claim 6, wherein said ratio of the weight of the carbon to the weight of the oxygen ranges from 0.2 to 1.0.

* * * * *